(12) United States Patent
Kato

(10) Patent No.: US 7,489,455 B2
(45) Date of Patent: Feb. 10, 2009

(54) LENS BARREL

(75) Inventor: Hiroshi Kato, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/896,239

(22) Filed: Aug. 30, 2007

(65) Prior Publication Data
US 2008/0062539 A1 Mar. 13, 2008

(30) Foreign Application Priority Data
Sep. 8, 2006 (JP) .............................. 2006-244609

(51) Int. Cl.
*G02B 7/02* (2006.01)
(52) U.S. Cl. ....................... 359/811; 359/819
(58) Field of Classification Search .......... 359/811–824
See application file for complete search history.

(56) References Cited
U.S. PATENT DOCUMENTS
7,280,291 B2 * 10/2007 Tsuji ........................... 359/819

2007/0109671 A1 * 5/2007 Teramoto et al. ............ 359/811

FOREIGN PATENT DOCUMENTS
JP 2001-242370 A 9/2001

* cited by examiner

Primary Examiner—Mohammed Hasan
(74) Attorney, Agent, or Firm—Birch, Stewart, Kolasch & Birch, LLP

(57) ABSTRACT

The present invention provides a lens barrel comprising: a lens barrel body; an extender including a rotary shaft which is parallel to the optical axis of the lens barrel body and shifted to the side of one side of the lens barrel body and a rotational member on which at least one lens is arranged, the extender arranging the lens on the optical axis of the lens barrel body according to a position where the rotational member stops rotating; a cover unit provided at the rear end of the lens barrel body and forming an extender covering space extending from the rear end of the lens barrel body toward one side and the top face of the lens barrel body and having a thickness in the direction of the optical axis of the lens barrel body; a small diameter unit provided on the cover unit; a mount unit provided at the rear end of the small diameter unit and on which is detachably mounted a camera device; and a flange back adjusting lever provided on the small diameter unit and located in a comparatively wide space formed between the camera device mounted on the mount unit and the lens barrel body.

2 Claims, 5 Drawing Sheets

LENS BARREL

BACKGROUND OF THE INVENTION

1. Field of the Invention

The present invention related to a lens barrel, and more particularly to a lens barrel with an extender.

2. Description of the Related Art

Hitherto, there has been known a lens barrel with an extender for quickly replacing a lens (refer to Japanese Patent Application Laid-Open No. 2001-242370, for example). The lens barrel is described with reference to FIG. 5.

As illustrated in FIG. 5, an extender 42' is arranged on the side of the rear end of the lens barrel body 12'. The extender 42' is equipped with a rotational member (turret) 52' in which a plurality of lenses 46' and 50' is arranged. Any one of the plurality of the lenses is arranged on an optical axis 14' of the lens barrel body 12' according to a position where the rotational member 52' stops rotating. This enables a lens to be quickly replaced.

The extender 42' is covered with a cover unit 12a' provided at the rear end of the lens barrel body 12'. The rotation axis 54' of the extender 42' (a rotational member 52') is provided on the side of a position shifted to the side of the top face (upward in the FIG. 5) of the lens barrel body 12,' so that the cover unit 12' extends from the end 12c' of the lens barrel body 12' toward the top face (upward in the FIG. 5) of the lens barrel body 12' and forms a cover space having a certain thickness in the direction of the optical axis 14' of the lens barrel body 12'. This covers the extender 42'.

The cover unit 12a' is provided with a small diameter unit 12b' on which a camera device C' is detachably mounted. As illustrated in FIG. 5, mounting the camera device C' on the small diameter unit 12b' interposes the small diameter unit 12b' between the lens barrel body 12' and the camera device C' and protrudes part of the cover unit 12a' toward the side of the camera device C'.

SUMMARY OF THE INVENTION

For this reason, the cover unit 12a' protruded toward the side of camera device C' becomes obstructive when a flange back adjusting lever (or a lever which corrects displacement between the imaging surface of the camera device C' and an imaging position in a lens system of the lens barrel) is provided on the small diameter unit 12b', causing a problem in that the flange back adjusting lever is difficult to manually operate.

The present invention has been made in view of the above situations and has its purpose to provide a lens barrel in which a flange back adjusting lever is easy to manually operate.

The invention according to a first aspect thereof is characterized by including a lens barrel body; an extender including a rotary shaft which is parallel to the optical axis of the lens barrel body and shifted to the side of one side of the lens barrel body and a rotational member on which at least one lens is arranged, the extender arranging the lens on the optical axis of the lens barrel body according to a position where the rotational member stops rotating; a cover unit provided at the rear end of the lens barrel body and forming an extender covering space extending from the rear end of the lens barrel body toward one side and the top face of the lens barrel body and having a thickness in the direction of the optical axis of the lens barrel body; a small diameter unit provided on the cover unit; a mount unit provided at the rear end of the small diameter unit and on which is detachably mounted a camera device; and a flange back adjusting lever provided on the small diameter unit and located in a comparatively wide space formed between the camera device mounted on the mount unit and the lens barrel body.

According to the first aspect of the present invention, the rotary shaft of the extender (rotational member) is provided at a position where the rotary shaft is shifted to the side of one side of (for example, the right side) of the lens barrel body, so that the cover unit forms an extender covering space extending from the rear end of the lens barrel body toward one side (for example, the right side) and the top face of the lens barrel body and having a certain thickness in the direction of the optical axis of the lens barrel body. This covers the extender. The cover unit is provided at a position where the cover unit is shifted to the side of one side (for example, the right side) and the top face of the lens barrel body.

Thus, mounting the camera device on the mount unit locates the small diameter unit between the lens barrel body and the camera device and protrudes the part of the cover unit toward the camera device. At the same time, a comparatively wide space is formed on the side of the other side (for example, the left side) and the bottom face of the lens barrel body.

The flange back adjusting lever is positioned in a comparatively wide space formed on the side of the other side of the lens barrel body. This permits manually operating the lever through the comparatively wide space. For this reason, the cover unit protruded toward the camera device does not become obstructive, which does not make it difficult to manually operate the flange back adjusting lever as is not the case with the conventional lens barrel. That is to say, it is enabled to provide the lens barrel easy to manually operate the flange back adjusting lever.

Since the comparatively wide space is formed on the side of the bottom face of the lens barrel body, even if an operation panel including a white balance adjusting key is provided on the underside of the front face of the camera device mounted on the mount unit, the operation panel can be manually operated through the comparatively wide space formed on the side of the bottom face of the lens barrel body. This improves the operability of the operation panel including a white balance adjusting key provided on the underside of the front face of the camera device.

In the invention according to the first aspect, the invention described in a second aspect is characterized in that the flange back adjusting lever is rotatably provided on the small diameter unit and a range in which the flange back adjusting lever is rotatable is set in the comparatively wide space formed between the camera device mounted on the mount unit and the lens barrel body.

According to the invention described in the second aspect, a range in which the flange back adjusting lever is rotatable is set in the comparatively wide space, which prevents the flange back adjusting lever from exceeding the rotatable range, rotating, being situated in a comparatively narrow space (or a space between the cover unit and the camera device). This improves the operability of the flange back adjusting lever.

According to the present invention, there is proved a lens barrel in which a flange back adjusting lever is easy to manually adjust.

DETAILED DESCRIPTION OF THE PREFERRED EMBODIMENTS

Figure 1:
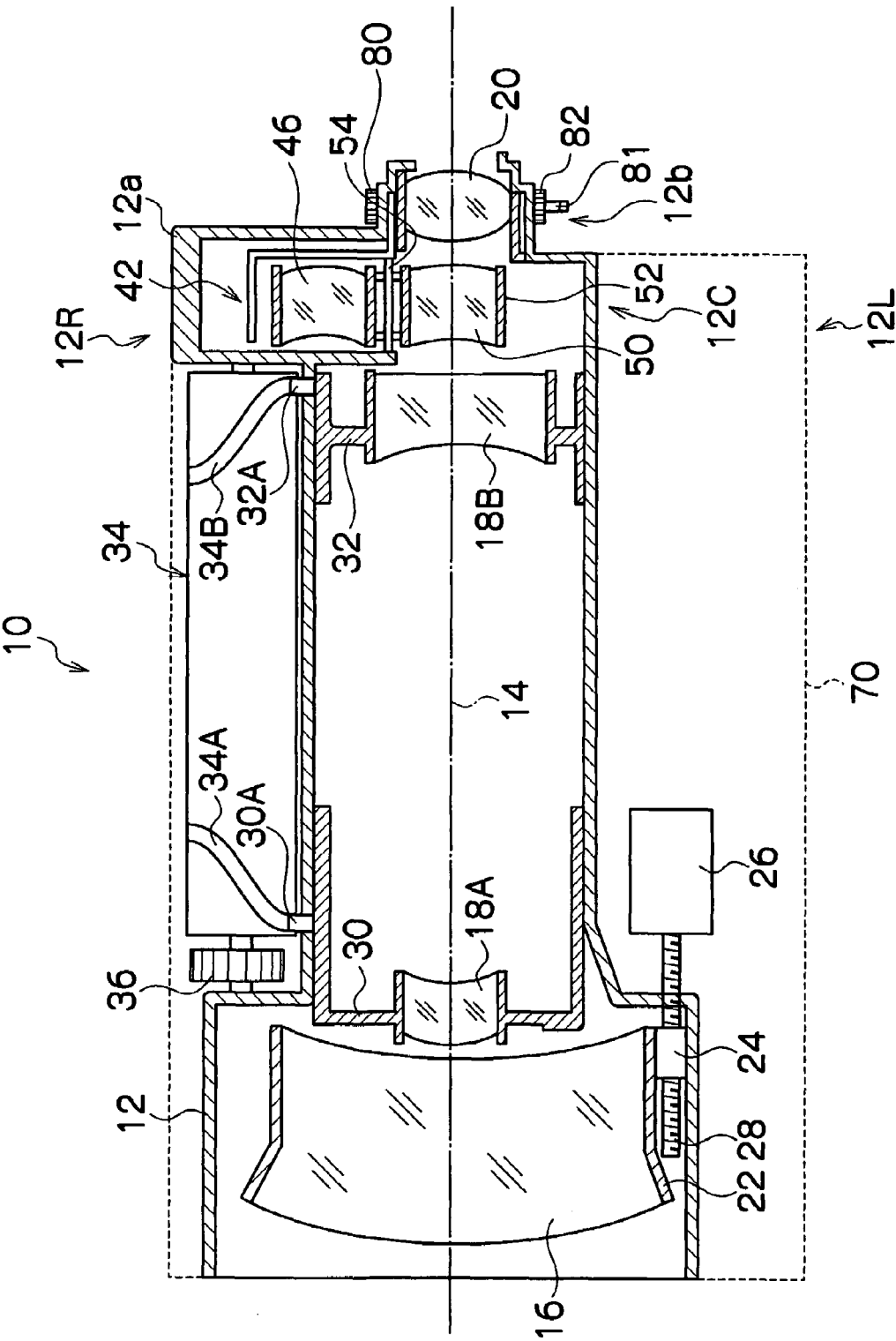
FIG. 1 is a cross section illustrating a lens barrel being one embodiment of the present invention.

A lens barrel being one embodiment of the present invention is described below with reference to the drawings. FIG. 1 is a cross section illustrating the lens barrel being one embodiment of the present invention.

As illustrated in FIG. 1, the lens barrel 10 includes a lens barrel body 12, extender 42, cover unit 12a covering the extender 42, small diameter unit 12b provided on the cover unit 12a, mount unit 80 (bayonet mount) provided at the rear end of the small diameter unit 12b and flange back adjusting lever 81 provided on the small diameter unit 12b.

Figure 2:
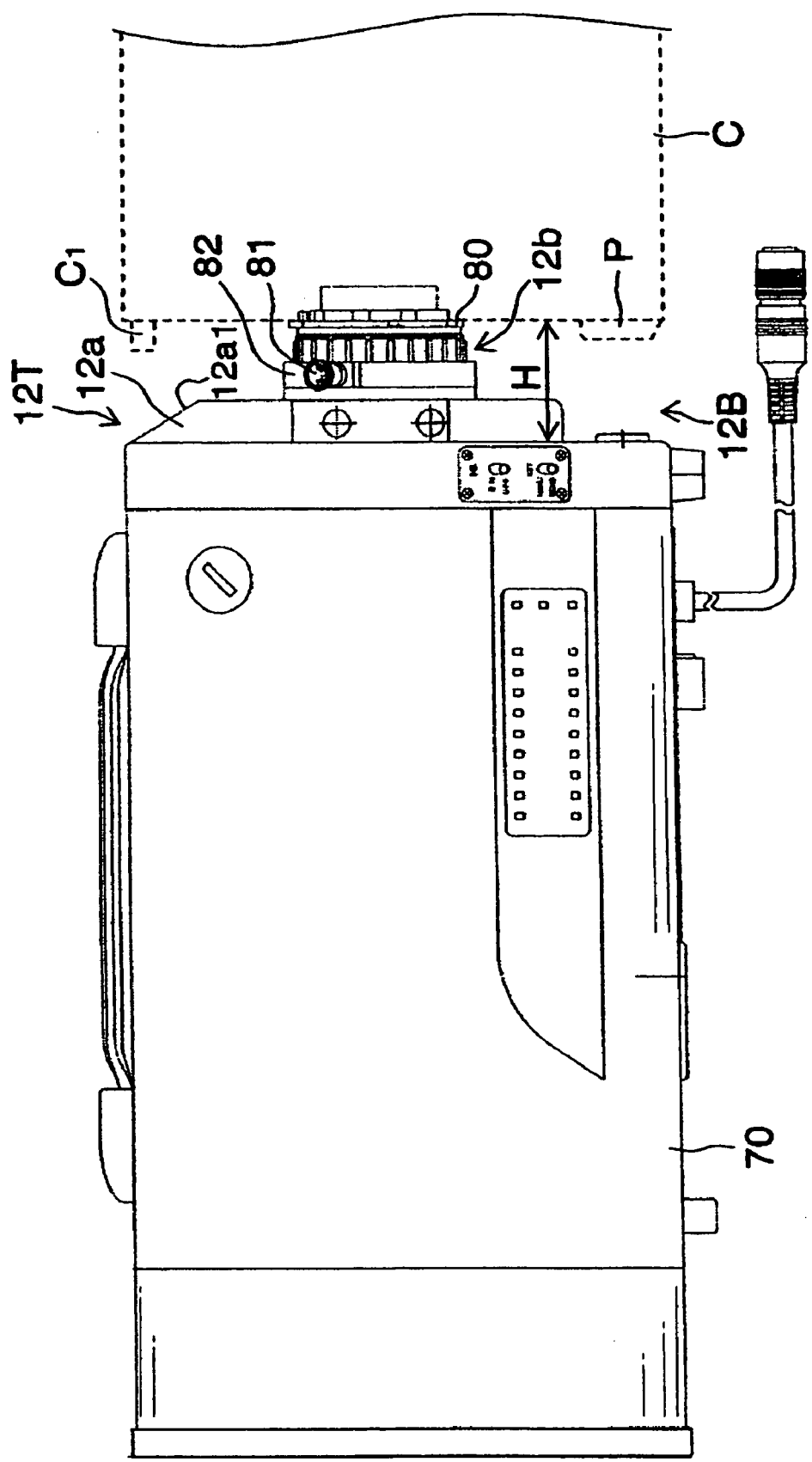
FIG. 2 is a side view of the lens barrel being one embodiment of the present invention.
Figure 3:
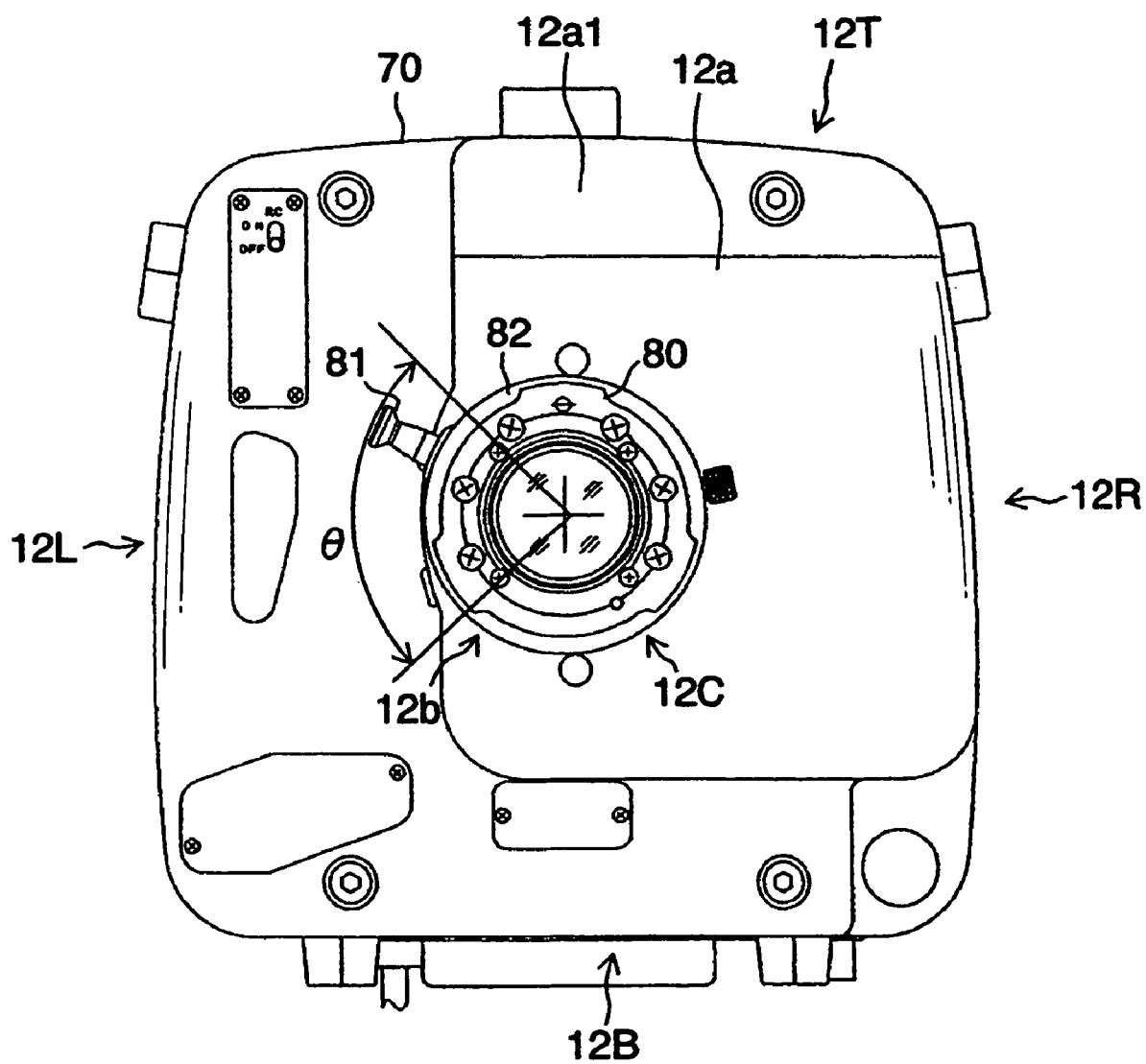
FIG. 3 is a rear view of the lens barrel being one embodiment of the present invention.

As illustrated in FIGS. 1, 2 and 3, the lens barrel body 12 is covered with a cover member 70 and whose profile looks like a box.

A focus lens 16, zoom lens 18 (variable power system lens 18A and correcting system lens 18B) and master lens 20 are disposed along an optical axis 14 inside the lens barrel body 12.

The focus lens 16 is held by a lens frame 22 to the underside of which a nut 24 is attached. The nut 24 is guided by a guide (not shown) formed in the lens barrel body 12 in the direction of the optical axis 14 and a threaded bolt 28 connected to the rotary shaft of a motor 26 is screwed there into. Therefore, the motor 26 is driven to rotate the threaded bolt 28, moving the focus lens 16 forward and backward in the direction of the optical axis 14.

The variable power system lens 18A and correcting system lens 18B are held by lens frames 30 and 32 respectively. The lens frames 30 and 32 are slidably supported in the direction of the optical axis 14 and cam followers 30A and 32A are provided on the upper end of the lens frames respectively. The cam followers 30A and 32A pass through a hole formed in the lens barrel body 12 and are engaged with the cam grooves 34A and 34B of a zoom cylinder cam 34. A gear 36 is affixed to one end of the zoom cylinder cam 34 and engaged with a gear (not shown) mounted on the drive shaft of a motor (not shown). The motor is driven to rotate the zoom cylinder cam 34 to move the variable power system lens 18A and correcting system lens 18B forward and backward along the locus defined by the cam grooves 34A and 34B of a zoom cylinder cam 34, performing zooming.

The cam grooves 34A and 34B are worked in such a shape that a zooming focus movement is not caused in a zooming operation of image pickup in a predetermined wavelength range. For example, the zooming focus movement is not caused in an image pickup in a near infrared light range of approximately 900 nm when a television camera is used mainly at night.

Figure 4:
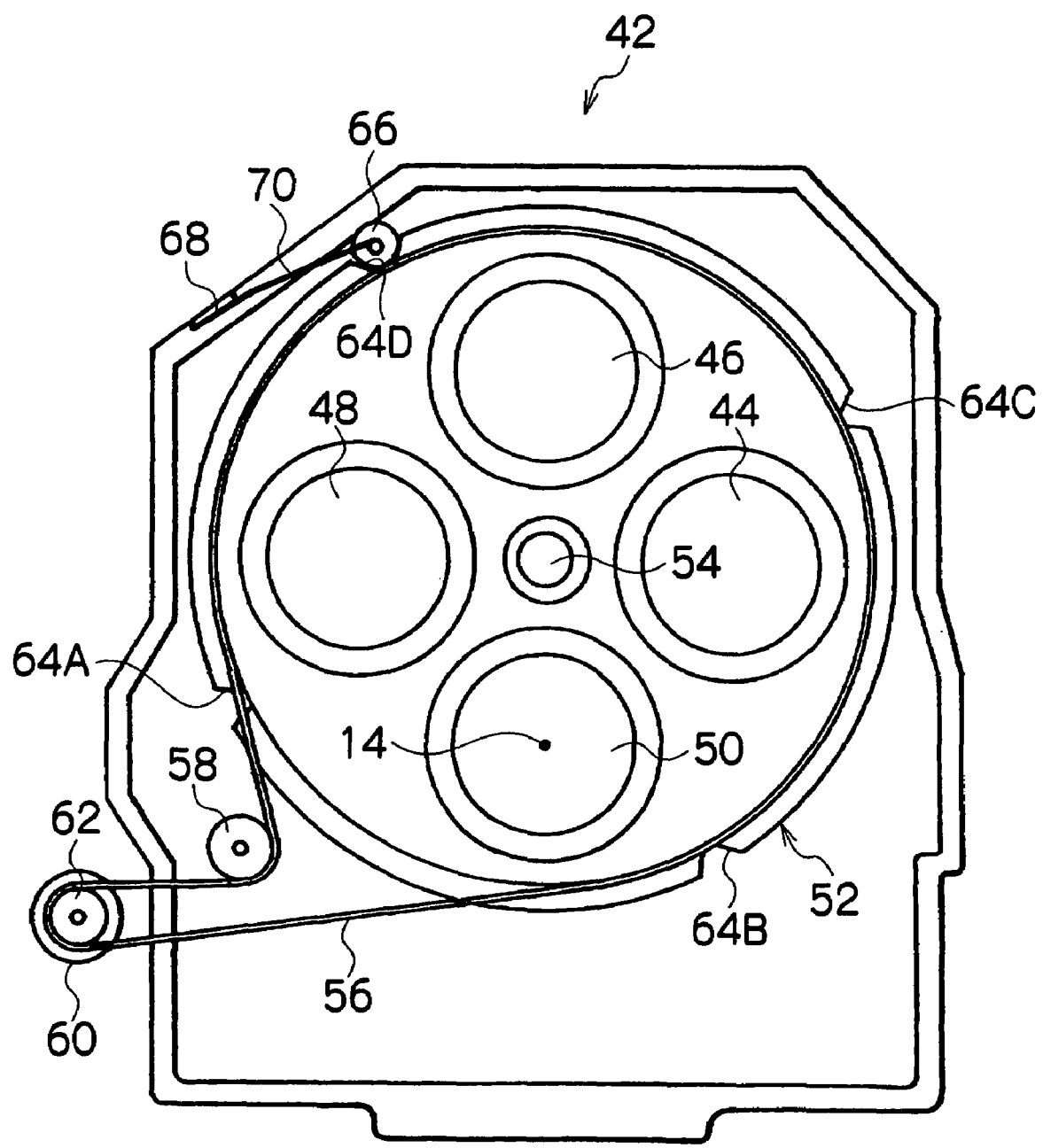
FIG. 4 is a diagram illustrating an extender of the lens barrel being one embodiment of the present invention.
Figure 5:
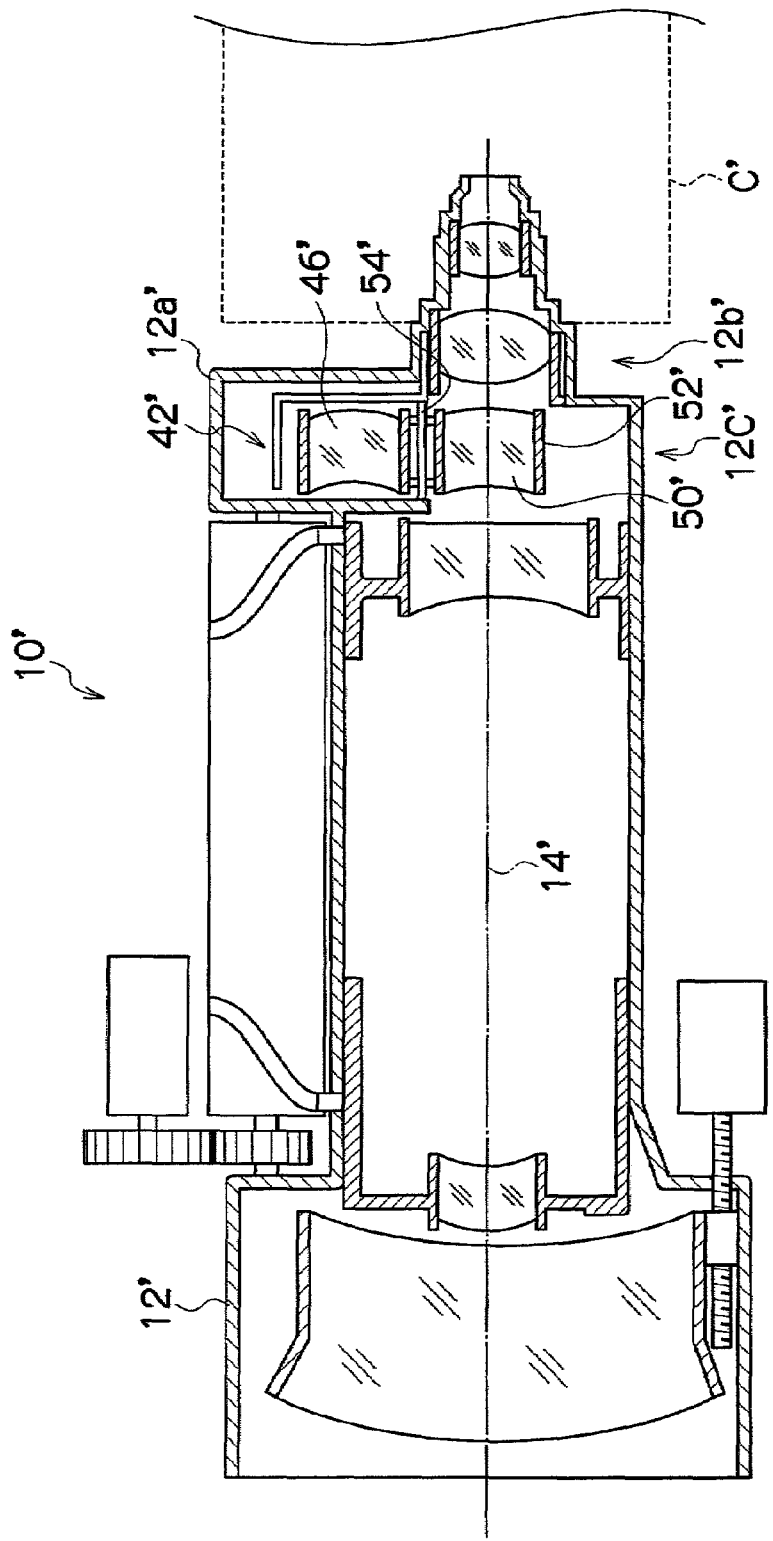
FIG. 5 is a diagram describing conventional problems.

As illustrated in FIG. 1, an extender 42 is provided on the side of the rear end 12c of the lens barrel body 12. The extender 42, as illustrated in FIG. 4, includes a turret plate 52 on which a plurality of lenses 44, 46, 48 and 50 (corresponding to an optical system for correcting a focus) is arranged and is adapted to arrange any one of the plurality of the lenses on the optical axis 14 of the lens barrel body 12 according to a position where the turret plate 52 stops rotating. This enables a lens to quickly be replaced.

The turret plate 52 is rotatably supported at its center portion by a shaft 54 supported by the lens barrel body 12. As illustrated in FIG. 1, the rotary shaft 54 of the turret plate 52 is provided in parallel to the optical axis 14 of the lens barrel body 12 and at a position where the rotary shaft 54 is shifted to the side of one side 12R of the lens barrel body 12.

Notches (not shown) are formed on the entire periphery of the turret plate 52 and an endless belt 56 is stretched there over. The belt 56 is stretched over a pulley 62 provided on a drive shaft of a motor 60 through a pulley 58. For this reason, the motor 60 is driven to transfer the driving force of the motor 60 to the turret plate 52 through the belt 56, rotating the turret plate 52 around the shaft 54.

V notches 64A, 64B, 64C and 64D are formed at equally spaced intervals around the periphery of the turret plate 52. In addition, a roller 66 engaging with one of the V notches 64A to 64D is provided at the upper left corner of the extender 42. The roller 66 is attached to a locking piece 68 affixed to the lens barrel body 12 through a leaf spring 70 and urged by the leaf spring 70 toward the side of the shaft 54 of the turret plate 52. Consequently, the turret plate 52 is rotated to cause the roller 66 engage with one of the V notches 64A to 64D, locating the turret plate 52.

The lenses 44, 46, 48 and 50 are arranged at an equal distance from the shaft 54. One of the lenses 44, 46, 48 and 50 is arranged on the optical axis 14 when the roller 66 engages with one of the notches 64A to 64D. For example, the lens 44 is arranged on the optical axis 14 when the roller 66 engages with the groove 64A, the lens 46 is arranged on the optical axis 14 when the roller 66 engages with the groove 64B, the lens 48 is arranged on the optical axis 14 when the roller 66 engages with the groove 64C, and the lens 50 is arranged on the optical axis 14 when the roller 66 engages with the groove 64D. That is to say, any one of the plurality of the lenses 44, 46, 48 and 50 is arranged on the optical axis 14 between the correcting system lens 18B and the master lens 20 according to a position where the turret plate 52 stops rotating.

The lenses 44, 46, 48 and 50 need to be prepared which are different in the combination of design wavelength and magnification. For example, the design wavelengths of the lenses 44 and 46 are taken to be 540 nm and those of the lenses 48 and 50 are taken to be 900 nm. Wherein, the design wavelength shall be such that an image can be formed at a predetermined position when object light with the wavelength is incident with respect to the wide end. Thereby, arranging the lenses 44 and 46 on the optical axis 14 enables the focus position to be corrected according to image pickup in the visible light range (a first wavelength range). Arranging the lenses 48 and 50 on the optical axis 14 enables the focus position to be corrected according to image pickup in the near infrared light range (a second wavelength range). Rendering an imaging magnification of the lenses 44 and 50 equal to each other and doubling an imaging magnification of the lenses 46 and 48 allow the imaging magnification to be switched in image pickup both in the visible light range and in the near infrared light range.

A control device (not shown) for controlling the drive of the motor 60 is connected to a sensor (not shown) for detecting an external light intensity. The motor 60 is rotated according to the detecting signal of the sensor to switch the lenses 44, 46, 48 and 50 to be arranged on the optical axis 14. The lenses 44 and 46 are arranged on the optical axis 14 when it is bright outside (that is, image pickup in the visible light range), for example, and the lenses 48 and 50 are arranged on the optical axis 14 when it is dark outside (that is, image pickup in the near infrared light range).

The extender 42 configured as described above is covered by the cover unit 12a provided at the rear end 12c of the lens barrel body 12. The rotary shaft 54 of the turret plate 52 is provided at a position where the rotary shaft 54 is shifted to the side of one side 12R of the lens barrel body 12, so that the cover unit 12a forms a cover space extending from the rear end 12c of the lens barrel body 12 toward one side 12R and the top face 12T of the lens barrel body 12 and having a certain thickness in the direction of the optical axis 14 of the lens barrel body 12 as illustrated in FIGS. 1 and 3. This covers the extender 42. As illustrate in FIG. 3, the cover unit 12a is provided at a position where the cover unit 12a is shifted to the side of one side 12R and the top face 12T of the lens barrel body 12.

Thus, as illustrated in FIG. 2, mounting the camera device C on the mount unit 80 locates the small diameter unit 12b between the lens barrel body 12 and the camera device C and protrudes the part of the cover unit 12a toward the camera device C. At the same time, a comparatively wide space (a space indicated by H in FIG. 2) is formed on the side of the other side 12L and the bottom face 12B of the lens barrel body 12.

As illustrated in FIGS. 2 and 3, a flange back adjusting lever 81 is provided on a ring member 82 rotatably attached to the periphery of the small diameter unit 12b and is located in a comparatively wide space (or a space indicated by H in FIG. 2) formed on the side of the other side 12L of the lens barrel body 12. This permits manually operating the flange back adjusting lever 81 through the comparatively wide space. For this reason, the cover unit 12a protruded toward the side of camera device C does not become obstructive, which does not make it difficult to manually operate the flange back adjusting lever 81 as is not the case with the conventional lens barrel. That is to say, according to the lens barrel 10 of the present embodiment, it is enabled to provide the lens barrel easy to manually operate the flange back adjusting lever 81.

Furthermore, a range in which the flange back adjusting lever is rotatable (or a range indicated by θ in FIG. 3) is set in the comparatively wide space (a space indicated by H in FIG. 2) as illustrated in FIG. 3, which prevents the flange back adjusting lever 81 from exceeding the rotatable range, rotating and being situated in a comparatively narrow space (or a space between the cover unit 12a and the camera device C). This improves the operability of the flange back adjusting lever 81.

As illustrated in FIG. 2, the cover unit 12a is provided at a position where the cover unit 12a is shifted to one side 12R and the top face 12T of the lens barrel body 12, thereby forming a comparatively wide space also on the side of the bottom face of the lens barrel body 12. For this reason, even if an operation panel P including a white balance adjusting key is provided on the underside of the front face of the camera device C mounted on the mount unit 80, the operation panel P can be manually operated through the comparatively wide space formed on the side of the bottom face of the lens barrel body 12. This improves the operability of the operation panel P including a white balance adjusting key provided on the underside of the front face of the camera device C.

Incidentally, as illustrated in FIG. 2, a connector C1 for a viewfinder (VF) is arranged on the upper portion of the camera device C. A cut-out 12a1 designed to escape from the connector C1 for the viewfinder (VF) is formed on the upper portion of the cover unit 12a.

Although the above embodiment describes an example where the cover unit 12a is provided at a position where the cover unit 12a is shifted to one side 12R and the top face 12T of the lens barrel body 12, the present invention is not limited to the above example. For example, the cover unit 12a may be provided at a position where the cover unit 12a is shifted to the side of the other side 12L and the top face 12T of the lens barrel body 12.

In addition, although the above present embodiment describes an example where a plurality of lenses 44, 46, 48 and 50 (corresponding to an optical system for correcting a focus) is arranged on the turret plate 52, the present invention is not limited to the above example. For example, at least one lens (for example, a lens having two times magnification) and a hollow opening without a lens (corresponding to a lens having one time magnification) are arranged on the turret plate 52 so that any of the lens or the hollow opening can be arranged on the optical axis 14 of the lens barrel body 12 according to a position where the turret plate 52 stops rotating.

It should be understood that the foregoing embodiment is merely exemplary in all respects, so that the above should not be construed as limiting the technical scope of the present invention. The present invention may be embodied in other various forms without departing from the spirit and chief advantages of the invention.

What is claimed is:

1. A lens barrel comprising:
   a lens barrel body;
   an extender including a rotary shaft which is parallel to the optical axis of the lens barrel body and shifted to the side of one side of the lens barrel body and a rotational member on which at least one lens is arranged, the extender arranging the lens on the optical axis of the lens barrel body according to a position where the rotational member stops rotating;
   a cover unit provided at the rear end of the lens barrel body and forming an extender covering space extending from the rear end of the lens barrel body toward one side and the top face of the lens barrel body and having a thickness in the direction of the optical axis of the lens barrel body;
   a small diameter unit provided on the cover unit;
   a mount unit provided at the rear end of the small diameter unit and on which is detachably mounted a camera device; and
   a flange back adjusting lever provided on the small diameter unit and located in a comparatively wide space formed between the camera device mounted on the mount unit and the lens barrel body.

2. The lens barrel according to claim 1, wherein
   the flange back adjusting lever is rotatably provided on the small diameter unit and a range in which the flange back adjusting lever is rotatable is set in the comparatively wide space formed between the camera device mounted on the mount unit and the lens barrel body.

* * * * *